United States Patent [19]

Nakazeki et al.

[11] 4,285,313

[45] Aug. 25, 1981

[54] AIR FLOW MEASURING DEVICE

[76] Inventors: Tsugito Nakazeki, Shunpuso, 133-banchi, Nakano, Iwata-shi, Shizuoka-ken; Yoshinobu Yasuda, 541-go, Company House of Toyo Bearing, 1358-banchi, Higashikaizuka, Iwata-shi, Shizuoka-ken, both of Japan

[21] Appl. No.: 53,261

[22] Filed: Jun. 29, 1979

Related U.S. Application Data

[63] Continuation-in-part of Ser. No. 29,027, Apr. 11, 1979, which is a continuation of Ser. No. 710,127, Jul. 30, 1976, abandoned.

[30] Foreign Application Priority Data

Jul. 31, 1975 [JP] Japan .............................. 50-93971

[51] Int. Cl.³ ............................................. F02D 11/08
[52] U.S. Cl. ..................................... 123/389; 123/336; 123/341
[58] Field of Search ............... 123/336, 340, 341, 389, 123/376, 403; 137/468, 489; 261/50 A

[56] References Cited

U.S. PATENT DOCUMENTS

| | | | |
|---|---|---|---|
| 2,505,292 | 4/1950 | Mallory | 123/389 |
| 2,668,697 | 2/1954 | Sager | 137/468 |
| 3,047,010 | 7/1962 | Rothfuss | 137/489 |
| 3,650,258 | 3/1972 | Jackson | 261/50 A |
| 4,153,018 | 5/1979 | Kimata et al. | 123/389 |

*Primary Examiner*—Craig R. Feinberg
*Attorney, Agent, or Firm*—Hall & Houghton

[57] ABSTRACT

An air flow measuring device comprising a flow detection valve located in a conduit and a servo-mechanism operable to maintain the difference in pressure across the detection valve at a control value, the servo-mechanism including a pressure-sensitive amplifier for sensing any deviation of the pressure difference from the control value by means of a pressure-responsive diaphragm and producing an amplified actuating pressure in response to such deviation and a valve actuator connected to the amplifier for receiving the actuating pressure and operatively connected to the flow detection valve for positioning same with the actuating pressure, wherein a resiliently deformable bellows filled with a given mass of a gas and having an effective pressure-sensitive-area equal to (the effective pressure-sensitive-area of the diaphragm)×(the control value under a reference condition of air)÷(the gas pressure in the bellows being equal to the reference pressure of air) is provided so that it is surrounded by air and that the force produced by the diaphragm due to the pressure difference is balanced by the resultant force of a force due to the resilient deformation of the bellows and a force produced by the bellows in response to alteration in temperature and pressure of air, whereby the control value becomes proportional to the specific gravity of air being measured, ensuring the determination of the mass rate of flow of air past the flow detection valve from the area of opening of the flow detection valve.

2 Claims, 3 Drawing Figures

Fig_1

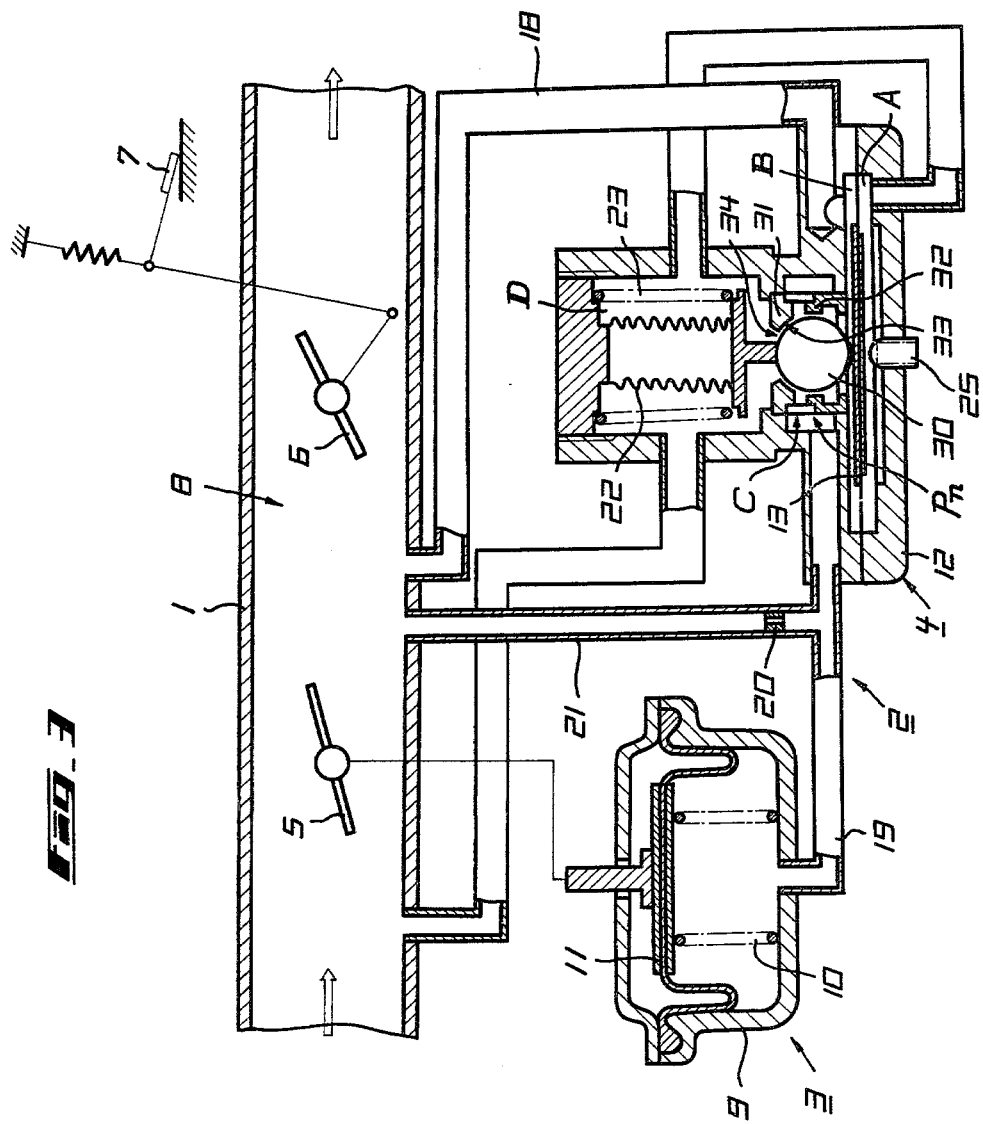

AIR FLOW MEASURING DEVICE

RELATED APPLICATION

This application is a continuation-in-part of application Ser. No. 29,027, filed Apr. 11, 1979, which, in turn, is a continuation application of application Ser. No. 710,127, filed July 30, 1976, which is now abandoned. This application is also related to application Ser. No. 710,126, filed July 30, 1976.

BACKGROUND OF THE INVENTION (a) Field Of The Invention

This invention relates to apparatus for determining and controlling the mass rate of flow of air flowing in an air intake conduit of an internal combustion engine and more particularly to such apparatus which is adapted to maintain a difference between the air pressures existing on opposite sides of an air flow detection valve located in the air intake conduit at a control value which is adapted to be varied in inverse proportion to the specific gravity of the air being measured, thereby ensuring the detection of the mass rate of flow of the intake air in terms of the area of opening of the air flow detection valve.

(b) Description Of The Prior Art

In internal combustion engines, e.g. for automobiles, it is particularly important to engine efficiency and exhaust gas pollution control to accurately control the mass ratio of air to fuel so as to keep it at a constant value. To this end, a high precision measuring device for measuring the amount of intake air is required. Generally, the conventional intake air flow determining and control apparatus for this purpose is known as the so-called area flowmeter which comprises a throttle valve placed in an air intake conduit and a flow detection valve placed upstream of the air throttle valve, the two valves defining an intermediate chamber, and means for controlling the pressure in said intermediate chamber so as to keep substantially constant the difference in the pressures existing on opposite sides of the flow detection valve, so that the amount of intake air is proportional to the area of opening of the flow detection valve, the volume rate of flow of air being thus detected by that area of opening. The control of the flow detection valve by this system is performed by employing a pressure difference control servo-mechanism based on the feedback system wherein when the difference in the pressures existing on opposite sides of the valve deviates from a predetermined control value, the deviation is detected by a pressure-responsive diaphragm of the servo-mechanism, the detected value being then amplified by a fluid mechanism, the resulting amplified output being used to increase or decrease the degree of opening of the flow detection valve so as to bring the pressure difference to the predetermined control value.

However, the intake air varies in its specific gravity with its pressure and temperature. Therefore, in order to accurately measure the mass rate of flow of air, a mechanism which compensates for temperature and pressure is required. Such mechanisms which have heretofore been used are in two types; electrical and mechanical. In either type, there are problems in terms of accuracy and cost. There has already been proposed a compensation mechanism of this kind using the above-described feedback control mechanism having incorporated therein a compensation section so designed that compensation for pressure is made by a pressure sensitive device and compensation for temperature is made by a temperature sensitive device. The mechanism, however, has problems in terms of the number of parts and construction.

SUMMARY OF THE INVENTION

The present invention is intended to provide an air flow determining and control apparatus capable of accurately determining the mass rate of flow of air by a simple mechanism.

According to the present invention, apparatus for determining and controlling the mass rate of air for use in an internal combustion engine comprises; an air throttle valve for controlling the flow-rate of air in the engine air intake conduit; an air flow detection valve located in said air intake conduit to produce a pressure difference over a portion of the air intake conduit; and a servo-mechanism operable to adjust the air flow detection valve to maintain the pressure difference at a control valve adapted to be varied in inverse proportion to the specific gravity of the intake air of the engine in order that the degree or in particular the area of opening of the flow detection valve is made proportional to the mass rate of flow of air past the flow detection valve.

The servo-mechanism includes a pressure-sensitive amplifier means for producing an amplified actuating pressure in response to any variations of the pressure difference from the control value, said amplifier means including a pressure-responsive diaphragm which is subjected on opposite sides to the air pressures existing on opposite sides of the air flow detection valve and movable in response to any variations in the pressure difference; a variable flow orifice having an opening area which is varied in association with the movement of the diaphragm to produce a variation in the actuating pressure; and setting means for varying said control value in inverse proportion to the specific gravity of the intake air. The servo-mechanism also includes valve opening means operatively connected to the pressure-sensitive amplifier means to receive the actuating pressure and to the air flow detection valve to adjust the same in response to any variation in said actuating pressure. The setting means for varying the control value as aforesaid comprises resiliently deformable bellows located in a chamber connected to the intake air conduit. The bellows is operatively connected at one end to the diaphragm of the pressure-sensitive amplifier means and at the other end to a main body of the pressure-sensitive amplifier means. The arrangement is such that a force produced by said bellows acts as a counterforce against a force produced by the diaphragm due to the pressure difference. The bellows is filled with a given mass of a gas in such a manner that when the intake air surrounding the bellows is at its reference temperature and pressure, the gas pressure in the bellows becomes equal to the reference pressure of the intake air. The bellows has an effective pressure-sensitive area equal to (the effective pressure-sensitive area of the diaphragm)×(the control value under a reference condition of the intake air)÷(the gas pressure in the bellows being equal to the reference pressure of the intake air), whereby the control value is determined in accordance with the resultant force of a force due to the resilient deformation of the bellows and a force produced by the bellows in response to alteration in temperature and pressure of the intake air and thereby being varied in inverse proportion to the specific gravity of the intake air of the engine.

The above characteristics of the present invention will be apparent from the following description by reference to the accompanying drawings.

BRIEF DESCRIPTION OF THE DRAWINGS

FIG. 3 is a sectional view of a third embodiment.

DESCRIPTION OF THE PREFERRED EMBODIMENTS

Figure 1:
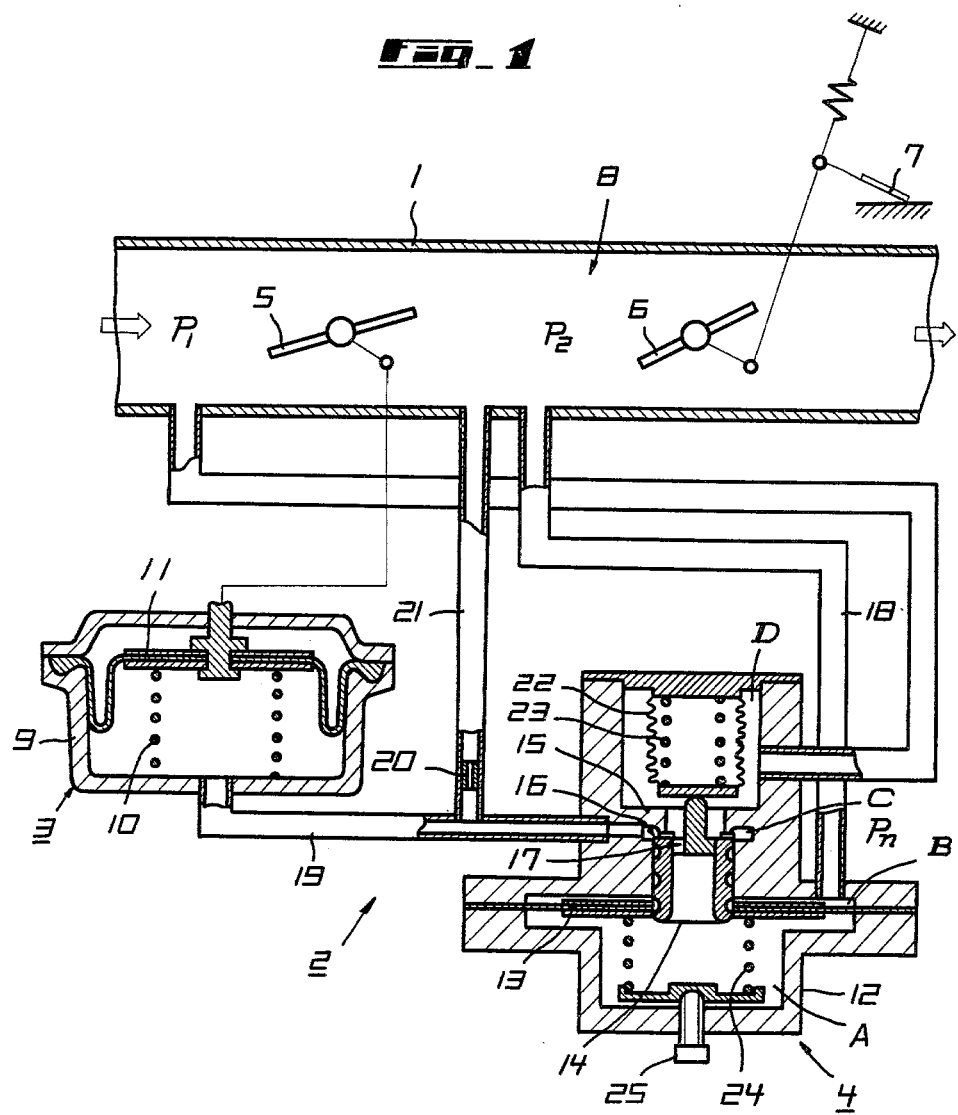
FIG. 1 is a schematic sectional view showing the principal components of an embodiment of the present invention.

Referring to the drawings, FIG. 1 shows a preferred embodiment of the present invention, wherein 1 designates the air intake conduit of an engine and 2 designates a servomechanism constituted by a valve opening device 3 and a pressure-sensitive amplifier device 4. Placed in the air intake conduit 1 are an air flow detection valve 5 and an air throttle valve 6. The flow detection valve 5 is connected to the valve opening device 3, while the throttle valve 6 is connected to the accelerator pedal 7. The valve 5 may be upstream, as shown, or downstream of the valve 6. It is to be noted in this connection that the air flow detection valve 5 is to produce a pressure difference over a portion of the air intake conduit in order that the measurement of the flow-rate of the intake air can be carried out on the basis of the area of opening of the air flow detection valve, while the flow-rate of the intake air is controlled by the throttle valve 6.

Let $P_1$ be the air pressure on the upstream side of the air flow detection valve 5 and $P_2$ be the pressure in an intermediate chamber 8 defined between the air flow detection valve 5 and the air throttle valve 6. If the pressure difference $(P_1 - P_2)$ is kept constant at all times, then it follows that the volume rate of flow of air is proportional to the area of opening of the flow detection valve 5, namely the cross-sectional area of the air passage defined in the air intake conduit by the valve 5. When the pressure difference $(P_1 - P_2)$ deviates from a control value, it is the pressure-sensitive amplifier device 4 that detects and amplifies such deviation and it is the valve opening device 3 that directly controls the opening and closing of the flow detection valve 5. Installed in the main body 9 of the valve opening device 3 is a diaphragm 11 acted on by a spring 10, the movable portion of said diaphragm 11 being connected to the flow detection valve 5 by a link. The interior of the main body 12 of the pressure-sensitive amplifier device 4 is divided into two chambers A and B by a pressure-responsive diaphragm 13, the movable portion of the pressure-responsive diaphragm 13 having a valve 14 connected thereto. The valve 14 cooperates with a valve seat 15 to define a variable flow orifice 16 whose area of opening is varied by the displacement of the valve 14. The variable flow orifice 16 interconnects chambers C and D. Designated at 17 is a hole through which the chambers A and D communicate with each other. Otherwise, the chambers A and D may be interconnected by a suitable pipe. The chamber B is connected to the intermediate chamber 8 by a pipe 18, while the chamber C is connected to the valve opening device 3 by a pipe 19 and via a choke 20 to the intermediate chamber 8 by a pipe 21. The chambers A and D are kept at the air pressure $P_1$ of the upstream side of the flow detection valve by the pipe connection to the intake conduit 1 upstream of the valve 5 and the chamber B is kept at the air pressure $P_2$ in the intermediate chamber.

The pressure-sensitive amplifier 4 is arranged principally to detect the deviation or variation of the pressure difference $(P_1 - P_2)$ and cause actuating pressure $P_n$ in the chamber C to vary, and the compensation for air pressure and temperature variations is made by a bellows 22 installed in the pressure-sensitive amplifier device 4 with the bellows being surrounded by the intake air. The bellows 22 is filled with a given mass of a gas in such a manner that when the intake air is at its reference temperature and pressure and thus the gas temperature in the bellows surrounded by the intake air becomes equal to the reference temperature of the intake air, the gas pressure in the bellows becomes equal to the reference pressure of the intake air. The reference temperature and reference pressure as above described mean respectively temperature and pressure of the intake air which is in its selected reference condition. The bellows 22 has one end in contact with the valve 14 so as not to be separated therefrom and the other end fixed to the main body 12. Springs 23 and 24 are provided so that each force of the springs and of the bellows, which constitute setting means for the control value at which any variations in the pressure difference should be maintained, acts on the pressure-responsive diaphragm 13 in parallel with one another.

The principle of the operation of the present inventive apparatus constructed in the manner described above will now be described.

If the pressure difference $(P_1 - P_2)$ deviates from a certain control value even slightly, the pressure-responsive diaphragm 13 is displaced to move the valve 14, so that the area of opening of the variable flow orifice 16 between the chambers C and D varies and the actuating pressure $P_n$ in the chamber C varies between $P_1$ and $P_2$. In this connection, it is to be mentioned that a displacement of a little over 10 microns of the diaphragm 13 is enough to cause the pressure $P_n$ to vary within the range of approximately from $P_1$ to $P_2$. The resultant force due to the bellows 22 and the springs 23 and 24 is balanced by the force produced by the diaphragm due to the pressure difference $(P_1 - P_2)$; in other words the resultant force serves for defining the control value for the pressure difference $(P_1 - P_2)$. Spring-force adjustment is possible by an adjusting screw 25, and in the balanced condition, the variable flow orifice 16 is in a slightly opened condition.

When the pressure difference $(P_1 - P_2)$ deviates to cause the pressure $P_n$ in the chamber C to vary, the diaphragm 11 of the valve opening device 3 communicating therewith is displaced and eventually the air flow detection valve 5 acts in such a direction as to reduce the deviation to zero.

Let Q be the mass rate of air flow past the flow detection valve 5, S be the opening area of the flow detection valve 5, $P_d$ be the pressure difference $(P_1 - P_2)$, g be the acceleration of gravity, K be the flow coefficient of the valve, and $\gamma$ be the specific gravity of air. Then, $$Q = K \cdot S \sqrt{2g \cdot P_d \cdot \gamma} \qquad (1)$$

In this case, the specific gravity $\gamma$ changes with pressure and temperature. If, therefore the mass rate of air flow Q is measured from the opening area S with the pressure difference $P_d$ kept constant, an error due to variations in $\gamma$ will be produced. Therefore, it becomes necessary to make compensation varying the control value for $P_d$ in inverse proportion to $\gamma$ so as to keep $P_d \cdot \gamma$ at a constant value. It is the bellows 22 that automatically makes this compensation, for which the following conditions must be met.

Let $S_1$ be the effective pressure-sensitive-area of the diaphragm 13, $P_{do}$ be the pressure difference at reference temperature and pressure of the intake air, that is, the control value under the reference condition of the intake air, $S_2$ be the effective pressure-sensitive-area of the bellows, and $P_o$ be the gas pressure in the bellows which is equal to the reference pressure of the intake air, where suffix "o" is applied to those which are in the reference condition. Then, it is necessary to satisfy the relation $$S_1 \cdot P_{do} = S_2 \cdot P_o \text{ or } S_2 = \frac{S_1 \cdot P_{do}}{P_o}$$

Then, $P_d \cdot \gamma$ becomes approximately constant regardless of variations in temperature and pressure according to Boyle's and Charles' laws.

First, let it be assumed that $$P_d \cdot \gamma = \text{a constant}$$

then $$\Delta(P_d \cdot \gamma) = P_{do} \cdot \Delta\gamma + \Delta P_d \cdot \gamma_o = 0 \quad (2)$$

where suffix "o" is applied to what is in its reference condition. According to Boyle's and Charles' laws, $$\gamma = P/(R \cdot T) \quad (3)$$

where R is gas constant, T is absolute temperature and P is pressure. From the equation (3), $$\frac{\Delta\gamma}{\gamma_o} = \frac{\Delta P}{P_o} - \frac{\Delta T}{T_o} \quad (4)$$

Although the pressure $P_b$ and temperature $T_b$ of the reference gas enclosed in the bellows are the same as $P_o$ and $T_o$ respectively in the reference condition, a change by $\Delta T_b$ in temperature inside the bellows will bring about a change in pressure by $\Delta P_b$. The relationship between $P_b$ abd $T_b$ is $P_b/T_b = $ a constant, provided the volumetric change of the bellows is negligible, and therefore $$\frac{\Delta P_b}{P_o} - \frac{\Delta T_b}{T_o} = 0 \quad (5)$$

The condition which makes the volumetric change of the bellows small enough to be negligible is that the increment of force $\Delta P_b \cdot S_2$ due to the pressure in the bellows acting on the end surface of the bellows is balanced by the sum of force $\Delta P_d \cdot S_1$ due to the increment of pressure differential acting on the pressure-responsive diaphragm and the force $\Delta P \cdot S_2$ due to the increment of ambient pressure acting upwardly on the end surface of the bellows, which condition is expressed by the equation $$\Delta P_b \cdot S_2 = \Delta P \cdot S_2 + \Delta P_d \cdot S_1 \quad (6)$$

By the way, from the equation (2), $$\frac{\Delta\gamma}{\gamma_o} = -\frac{\Delta P_d}{P_{do}} \quad (2')$$

Since $T \approx T_b$, from the equations (2') and (5), the equation (4) is $$-\frac{\Delta P_d}{P_{do}} = \frac{\Delta P}{P_o} - \frac{\Delta P_b}{P_o}$$

that is $$\frac{\Delta P_b}{P_o} = \frac{\Delta P}{P_o} + \frac{\Delta P_d}{P_{do}} \quad (a)$$

From equation (6), $$\frac{\Delta P_b}{P_o} = \frac{\Delta P}{P_o} + \frac{S_1}{S_2} \cdot \frac{\Delta P_d}{P_o} \quad (6')$$

From (a) and (6')

$$\frac{\Delta P_d}{P_{do}} = \frac{S_1}{S_2} \cdot \frac{\Delta P_d}{P_o}$$

Thus $$\frac{P_o}{P_{do}} = \frac{S_1}{S_2} \text{ or } P_o \cdot S_2 = P_{do} \cdot S_1$$

or $$S_2 = \frac{S_1 \cdot P_{do}}{P_o} \quad (7)$$

Thus, when the equation (7) is satisfied, it follows that the control value which is determined in accordance with the resultant force of the spring force and a force produced by the bellows in response to temperature and pressure of the intake air is varied approximately in inverse proportion to the specific gravity of the intake air and therefore $P_d \cdot \gamma$ becomes approximately constant regardless of variations in the temperature and pressure of the intake air.

The above condition is established when the range of displacement of the diaphragm is a little over 10 microns and when the volumetric change of the bellows is negligible, and it can be set independently of the spring 23 and/or 24 when $P_d \cdot \gamma$ is kept constant as described above, the mass rate of intake air flow becomes proportional to the opening area of the air flow detection valve. If, therefore, the fuel flow control mechanism (not shown) is connected so that the adjustment of the air flow detection valve is followed by the adjustment of the fuel flow control mechanism, which is now a matter of course in the art and is not shown, the fuel flow to the engine is proportional to that opening area of the air flow detection valve. Thus, the mass ratio of air to fuel can be kept constant regardless of the temperature and pressure of the atmosphere.

In addition, the bellows 22 and the spring 23 and/or 24 have been shown disposed so that each of the force of the springs and of the bellows acts on the diaphragm in parallel, it being noted that they cannot be placed in series since this causes the volumetric change of the bellows according to its resilience as a result of changes in the temperature and pressure of the intake air and since the conditions which compensate, simply and economically, for temperature and pressure by enclosing a gas in the bellows disappear. Further, the adjusting screw 25 is provided for spring-force adjusting, but it can also be utilized for air-fuel ratio adjustment when the engine is at a low temperature or is accelerating or decelerating.

Further, the spring 24 may be omitted so long as the lower portion of the bellows is maintained unseparable from the valve 14 fixed to the movable portion of the diaphragm. In that case, the adjusting screw 25 may be so arranged that it directly adjust the spring 23.

Further, the inherent resilience of the bellows itself may be utilized instead of using the spring 23 and/or 24.

Figure 2:
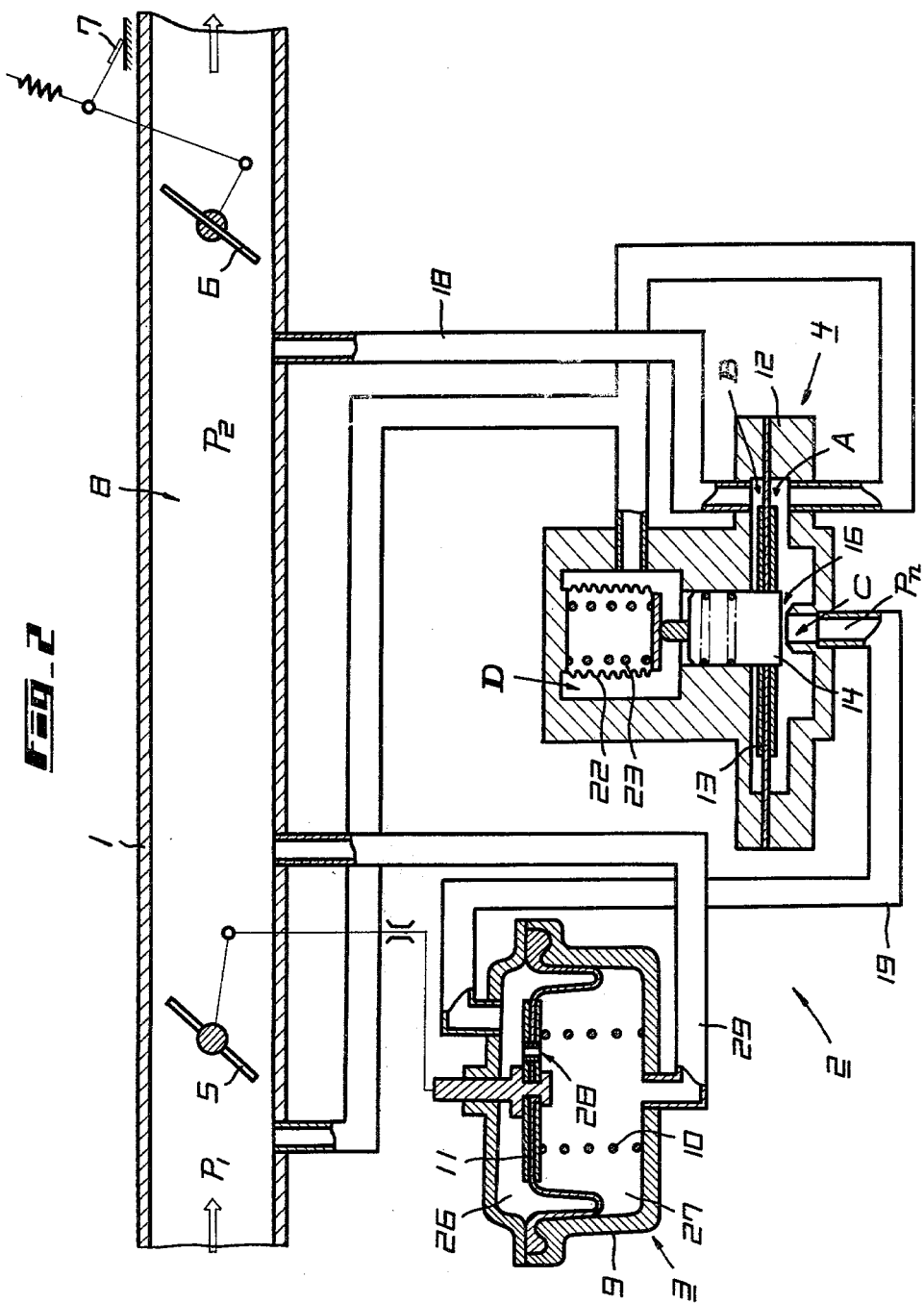
FIG. 2 is a schematic sectional view showing the principal components of another embodiment of the invention.

FIG. 2 shows another embodiment of the invention, wherein the chamber C is provided below the diaphragm 13 so that a decrease in the pressure in the chamber B, namely, the pressure $P_2$ in the intermediate chamber 8 may cause the valve 14, which for example is in the form of a cylindrical lift valve, to be displaced upwardly to open the variable flow orifice 16. In this case, the actuating pressure $P_n$ acts in the upper chamber 26 of the valve opening device 3. In addition, the lower chamber 27 communicates with a fixed choke 28 provided in the diaphragm 11 secured to the flow detection valve 5 and also communicates with the intermediate chamber 8 through a pipe 29.

FIG. 3 shows another embodiment of the invention, wherein a valve 30 interlocked to the diaphragm 13 is in the form of a sphere guided by the cylindrical portion 32 of a valve housing 31 and a variable orifice 34 is defined between it and a part-spherical inner surface 33. The use of a sphere as the valve in this way assures that the displacement of the diaphragm is satisfactorily followed by the change of the opening area of the variable orifice.

As has been described so far, according to the present invention, satisfying the condition $S_1 \cdot P_{do} = S_2 \cdot P_o$ is enough to compensate for variations in the specific gravity of the intake air caused by variations in its temperature and pressure by means of a single compensation system. Therefore, the compensation system for temperature and pressure is greatly simplified and inexpensive.

What we claim is:

1. Apparatus for determining and controlling the mass rate of flow of air for use in an internal combustion engine having an air intake conduit comprising:
   A. an air throttle valve for controlling the flow-rate of air in said air intake conduit;
   B. an air flow detection valve located in said air intake conduit to produce a pressure difference over a portion of the air intake conduit; and
   C. a servo-mechanism operable to adjust the air flow detection valve to maintain the pressure difference at a control value adapted to be varied in inverse proportion to the specific gravity of the intake air of the engine so that the opening area of the flow detection valve is made proportional to the mass rate of flow of air past the flow detection valve, said servo-mechanism including
   a. pressure-sensitive amplifier means for producing an amplified actuating pressure in an air flow path formed between the throttle and detection valves in response to any variations of the pressure difference from the control value, said amplifier means including
      i. a pressure-responsive diaphragm subjected on opposite sides to the air pressure existing on opposite sides of the air flow detection valve and movable in response to any variation in the pressure difference,
      ii. a variable flow orifice connected in said air flow path and having an opening area which is varied in association with the movement of said diaphragm to produce a variation in the actuating pressure, and
      iii. setting means for varying said control value in inverse proportion to the specific gravity of the intake air, and
   b. valve opening means operatively connected to the pressure-sensitive amplfier means to receive the actuating pressure and to the air flow detection valve to adjust said flow detection valve in response to any variation in said actuating pressure;

said setting means for varying the control value in inverse proportion to the specific gravity of the intake air comprising resiliently deformable bellows located in a chamber which in turn is connected to said air flow path, said resiliently deformable bellows being operatively connected at one end to said diaphragm of the pressure-sensitive amplifier means and at the other end to a main body of the pressure-sensitive amplifier means with the arrangement being such that a force produced by said bellows acts as a counterforce against a force produced by the diaphragm due to the pressure difference, said bellows being filled with a given mass of a gas in such a manner that when the intake air surrounding the bellows is at its reference temperature, the gas pressure in the bellows becomes equal to a reference pressure of the intake air, said bellows having an effective pressure-sensitive-area equal to: (the effective pressure-sensitive-area of the diaphragm)×(the control value under a reference condition of the intake air)÷(the gas pressure in the bellows being equal to the reference pressure of the intake air), whereby said control value is determined in accordance with the resultant force of a force due to the resilient deformation of the bellows and a force produced by the bellows in response to alteration in temperature and pressure of the intake air and thereby being varied in inverse proportion to the specific gravity of the intake air of the engine.

2. Apparatus as set forth in claim 1 in which a spring provides the bellows resilience.

* * * * *